United States Patent [19]

Perlstein et al.

[11] 4,439,505

[45] Mar. 27, 1984

[54] ELECTRICAL CONDUCTIVE COMPOSITIONS

[75] Inventors: Jerome H. Perlstein, Rochester; Neil F. Haley, Fairport, both of N.Y.

[73] Assignee: Eastman Kodak Company, Rochester, N.Y.

[21] Appl. No.: 341,418

[22] Filed: Jan. 21, 1982

[51] Int. Cl.³ .............................................. G03G 5/14
[52] U.S. Cl. ....................................... 430/58; 430/62; 430/529; 430/922
[58] Field of Search ................. 430/62, 529, 527, 922, 430/58

[56] References Cited

U.S. PATENT DOCUMENTS

| | | |
|---|---|---|
| 3,862,094 | 1/1975 | Shinohara . |
| 4,046,950 | 9/1977 | Isett . |
| 4,052,272 | 10/1977 | McGroddy et al. ................. 430/324 |
| 4,312,935 | 1/1982 | Engler et al. ........................ 430/270 |

FOREIGN PATENT DOCUMENTS

| | | |
|---|---|---|
| 2739584 | 6/1978 | Fed. Rep. of Germany . |
| 56-26305 | 3/1981 | Japan . |
| 1291437 | 10/1972 | United Kingdom . |

OTHER PUBLICATIONS

Annuals of New York Academy of Sciences, vol. 313, pp. 61–78, *Synthesis and Properties of Low-Dimensional Materials*.
Journal f. praktische Chemie, vol. 321, No. 4, 1979, pp. 675–679.
Nature, vol. 289, Jan. 29, 1981, pp. 390–391.

*Primary Examiner*—John E. Kittle
*Assistant Examiner*—John L. Goodrow
*Attorney, Agent, or Firm*—John R. Everett

[57] ABSTRACT

Compositions comprising a polymer and dendrite crystals of a salt consisting of the cation of 2-(4,5-dihydronaphtho[1,2-d]-1,3-dithiole-2-ylidene)-4,5-dihydronaphtho [1,2-d]-1,3-dithiole and an anion are useful in forming conductive coatings.

8 Claims, No Drawings

ELECTRICAL CONDUCTIVE COMPOSITIONS

FIELD OF THE INVENTION

The present invention relates to novel conductive compositions and elements. A novel process for making such compositions is also disclosed.

BACKGROUND OF THE INVENTION

The unwanted buildup of static electricity on an insulated support is a continuing problem. It is well known that a thin conductive layer will prevent static buildup and it is possible to formulate a conductive composition that can be coated on a support. However, it has been quite difficult to combine these conductive properties with other desirable physical properties such as physical stability.

A number of charge transfer complexes are electrically conducting. For example, complex salts of 2-(4,5-dihydronaphtho[1,2-d]-1,3-dithiol-2-ylidene)-4,5-dihydronaphtho[1,2-d]-1,3-dithiole (DTTF) with 7,7,8,8-tetracyanoquinodimethane(TCNQ) are electrically conducting. However, when such complexes are combined with an electrically insulating polymer composition to incorporate other physical properties, the resulting composition exhibits no useful electrical conductivity. As a result, charge transfer complexes have been limited in their utility in forming useful antistatic and conductive layers for elements such as electrographic, electrophotographic and photographic elements.

It is desirable to obtain coating compositions of such charge transfer complexes with electrically insulating polymers as those polymers would provide physical stability for the coating, as well as other desirable properties required for many applications.

SUMMARY OF THE INVENTION

The present invention provides a composition comprising a polymer which is preferably organic solvent-soluble and a charge transfer complex characterized in that the charge transfer complex is (a) in the form of dendrite crystals throughout the polymer and is (b) a salt consisting of a cation of 2-(4,5-dihydronaptho[1,2-d]-1,3-dithiol-2-ylidene)-4,5-dihydronaphtho-[1,2-d]-1,3-dithiole and an anion selected from the group consisting of 7,7,8,8-tetracyanoquinodimethane (TCNQ$^-$), ClO$_4^-$, BF$_4^-$, PF$_6^-$, F$^-$, Cl$^-$, I$^-$, and I$_3^-$. The compound 2-(4,5-dihydronaphtho[1,2-d]-1,3-dithiol-2-ylidene)-4,5-dihydronaphtho[1,2-d]-1,3-dithiole, hereinafter referred to as DTTF, has the structure

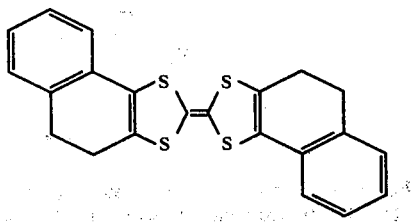

The compositions have resistivities in the range from $10^4$ to $2 \times 10^8$ ohm/sq. depending on the particular organic-solvent-soluble polymeric binder used. The compositions are useful in the form of self-supporting layers or as a coating on a support in any element in which it is desirable to both provide stability and to avoid the buildup of static electricity or to provide an electrically conductive layer. The dendrite crystals, in combination with an electrically insulating polymer results in an electrically conducting composition.

The present invention also provides a method for making the novel electrically conductive composition of the invention. The method comprises the steps of:

(a) forming a charge transfer complex from a cation of DTTF and an anion selected from the group consisting of TCNQ$^-$, ClO$_4^-$, BF$_4^-$, PF$_6$, F$^-$, Cl$^-$, I$^-$ and I$_3^-$;

(b) mixing from about 1 to 20 parts of the charge transfer complex with about 5 to 200 parts of an electrically insulating polymer; and (c) aggregating the charged transfer complex in the polymer thereby forming dendrite crystals throughout the polymer.

The preferred charge transfer complexes for the present invention comprise DTTF as the cation and an anion selected from the group consisting of TCNQ$^-$ and ClO$_4^-$.

DETAILED EMBODIMENTS OF THE INVENTION

The electrically conductive composition of this invention is formed by combining the charge transfer complex with an electrically insulating polymeric binder in an organic solvent for the polymer and then coating the resulting composition on a suitable support and drying. The insulating coating has a resistance greater than $2 \times 10^8$ ohms/sq.

The coating composition is rendered conductive by aggregating the charge transfer complex in the polymer. One technique for aggregating the charge transfer complex in the polymer is by contacting the composition of the charge transfer complex and polymer with vapors of a solvent which is capable of being absorbed into (penetrating) the layers. Such vapor exposure is generally effective to induce aggregation at about 70° F. after about two minutes. Likewise, inhibition of solvent removal in an otherwise conventional coating of a dope solution comprising the dye and polymer results in aggregation. Immersing the coating in a solvent, or coating from an original solvent mixture which contains a high boiling solvent which persists in the coating during drying, are among other methods of inducing aggregation of the charge transfer complex. The aggregated coating is characterized by dendrite crystals throughout the polymeric binder. Useful organic solvents include chloroform, toluene, dichloromethane, acetone, acetonitrile, tetrahydrofuran, p-dioxane and trichloropropane.

Examples of useful polymers are selected from polycarbonates, polyesters, polysulfones, polyacrylates, polymethacrylates, poly(vinylbutyrals), poly(vinylalcohol) and polyacetals. Specific examples of useful polymers include poly(4,4'-isopropylidenediphenylene carbonate), poly(oxy-1,4-phenylenesulfonyl-1,4-phenyleneoxy-1,4-phenyleneisopropylidene-1,4-phenylene), poly[ethylene-co-isopropylidene-bis-(1,4-phenyleneoxy-ethylene)-terephthalate], poly(vinylbutyral), and poly(n-butylmethacrylate-co-styrenesulfonic acid, potassium salt.

In general, the amount of the charge transfer complex combined with the electrically insulating polymer to produce the electrically conducting compositions in layers of the present invention varies widely. All that is required is that enough of the charge transfer complex is used to form the network of dendrite crystals throughout the polymer. In general, the charge transfer complex is present in the electrically insulating polymer in an amount of about 0.1% to 20 weight percent based on the total weight of the composition.

The compositions of the invention are usefully coated on a wide variety of supports to form useful antistatic or conducting elements. For example, the coating compositions described herein can be coated on polymeric materials such as poly(ethylene terephthalate), cellulose acetate, polystyrene, poly(methyl methacrylate) and the like as well as other supports such as glass, paper including resin-coated paper and metals. Fibers, including synthetic fibers, useful for weaving into cloth, are also examples of useful supports. Planar supports such as polymeric films are particularly useful for photographic elements. The compositions of the present invention are useful in virtually any article where it is desired to have a conductive coating. For example, the compositions are coated on small plastic parts to prevent the unwanted buildup of static electricity or coated on small polymeric spheres or other shapes such as those used for toners in electrography and the like.

The compositions of the present invention are coated onto the support using any suitable method. For example, the compositions are coated by spray coating, fluidized bed coating, dip coating, doctor blade coating or extrusion hopper coating, to mention a few well-known coating techniques.

In some embodiments, it is desirable to overcoat the layer of the compositions of the present invention with a protective layer. The protective layer is present for a variety of reasons. For example, the protective layer is an abrasion-resistant layer or a layer which provides other desirable physical properties. In many embodiments, for example, it is desirable to protect the conductive layers of the present invention from conditions which could adversely affect the aggregated composition. The protective layer is generally a film-forming polymer which is applied using coating techniques such as those described above for forming the conductive layer itself.

The compositions of the present invention are particularly useful in forming antistatic layers for photographic elements or conductive layers in electrographic and electrophotographic elements. These elements comprise a support having coated thereon at least one radiation-sensitive layer.

While the conductive layers described herein can be located anywhere in a photographic or electrophotographic element, it is preferred that the conductive layer be coated on the side of the support opposite the side having the coating of the radiation-sensitive material. The coating compositions of the present invention are advantageously coated directly on the support which has a thin subbing layer and are then overcoated with the described protective layer. Alternatively, the conductive layers of the present invention are on the same side of the support as the radiation-sensitive materials and the protective layers are included as interlayers or overcoats, if desired.

The radiation-sensitive layers of the photographic or electrophotographic elements of the present invention can comprise photographic silver salt emulsions, such as silver halide emulsions; diazo-type compositions; vesicular image-forming compositions; photopolymerizable compositions; electrophotographic compositions comprising radiation-sensitive photoconductors and the like. Photographic silver halide emulsions are particularly preferred and are described, for example, in *Product Licensing Index*, Publication 9232, Vol. 92, December, 1971, pages 107–110.

A particularly useful element of the present invention is an electrographic element. The conductive layers of the present invention, because of the uniformity of their conductivity and the humidity independence of their conductivity, are excellent conductive layers for such an element. This embodiment comprises a support having coated thereon the conductive layer as described herein and, as the outermost layer, a dielectric layer. The dielectric layer is formed from any dielectric film-forming material. Examples of such materials include any of the electrically insulating polymers used in forming the compositions and layers of the invention and the polymers listed above as useful as the protective layer.

Electrographic elements including electrophotographic elements, are well known in the art and are described, for example, by Dessauer and Clark, *Xerography and Related Processes*, Focal Press, 1965, Chapter XVI, pages 439–450.

The resistance of the surface of the coatings of the present invention is measured using well-known techniques. The resistivity is the electrical resistance of a square of a thin film of material measured in the plane of the material between opposite sides. This is described more fully in R. E. Atchison, *Aust. J. Appl. Sci.*, 10 (1954).

The salts of the invention were prepared according to the following procedures:

Preparation I

Preparation of DTFF:TCNQ Salts

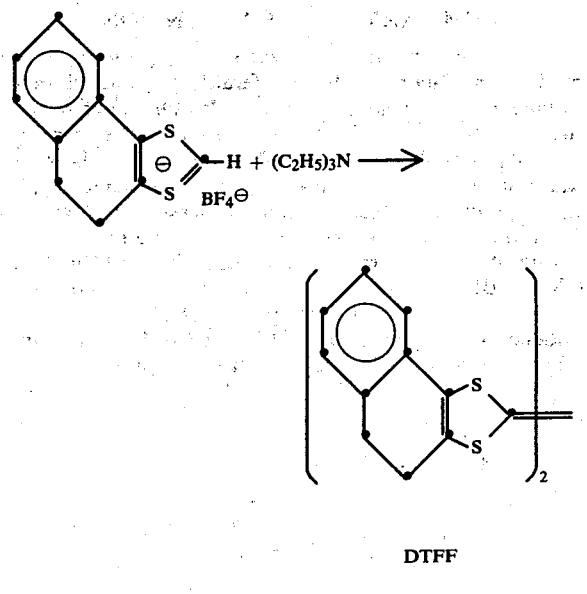

DTFF

A solution was made by dissolving 7.2 g (0.025 mole) of 4,5-(3,4-dihydronaphtho[a])-1,3-dithioliumtetrafluoroborate in 55 ml of acetonitrile containing 7.59 g (0.075 mole) of triethylamine by adding the latter dropwise with magnetic stirring over 15 minutes. Another 15 ml of acetonitrile was added and the mixture stirred for one hour at ambient temperature. As the solution cooled in an ice bath, orange crystals precipitated. They were collected by filtration. After washing with cold acetonitrile, the product was air-dried. A yield of 4.32 g (85%) of DTFF as an orange solid was obtained.

A solution of 0.126 mmoles of DTFF was dissolved in hot tetrahydrofuran (THF). 0.176 mmoles of TCNQ was dissolved in hot acetonitrile and added to the DTFF solution. The mixture was allowed to cool. The DTFF:TCNQ salt was obtained as a grey-black precipitate.

Preparation II

Preparation of DTFF:ClO₄ Salts

To a suspension of 1.00 mmole of DTFF in 60 ml of hot acetonitrile was added 1.007 mmoles of perchloric acid in acetonitrile and 0.504 mmole of $H_2O_2$ in water. The solution was concentrated to ⅓ of its original volume and then cooled to room temperature. A DTFF:ClO₄ of mixed composition was obtained as a green crystalline precipitate. The precipitate was filtered and washed with cold acetonitrile.

The above procedure was used to prepare three separate compositions having the following stoichiometries:
(a) $C_{22}H_{16}S_{3.6}(ClO_4)_{0.32} + O_{0.76}$
(b) $C_{22}H_{18}S_{3.6}(ClO_4)_{0.35} + O_{0.71}$
(c) $C_{22}H_{16}S_{3.6}(ClO_4)_{0.32} + O_{1.22}$.

The following examples illustrate the conductivity achieved by the compositions of the present invention.

EXAMPLE 1

Preparation and Electrical Properties of poly(4,4'-isopropylidenediphenylene carbonate) Films Containing DTFF:TCNQ Salt To a solution of 5 mg of DTFF:TCNQ in 1:1 THF:acetonitrile (by volume) was added 2 ml of a solution containing 100 mg of poly(4,4'-isopropylidenediphenylene carbonate) in 1:1 dichloromethane:p-dioxane. The solution was coated on unsubbed polyester support to a wet thickness 0.002 mil, and dried in air. Samples of the dried film were vapor-treated with various solvents for varying lengths of time and the resistance was measured on a 2 cm by 2 cm square sample using silver paste contacts. The results are disclosed in Table I.

TABLE I

| Solvent | Vapor Treatment Time (in seconds) | Resistance of Films (Ohm/Square) |
|---|---|---|
| Untreated Film | | $>10^9$ |
| Chloroform | 25 | $2.8 \times 10^5$ |
| Dichloromethane | 25 | $5.1 \times 10^5$ |
| Acetone | 35 | $2.8 \times 10^5$ |
| Acetonitrile | 20 | $10 \times 10^5$ |
| THF (tetrahydrofuran) | 15 | $80 \times 10^5$ |
| THF | 35 | $5.9 \times 10^5$ |

EXAMPLE 2

Polysulfone Films Containing DTFF:TCNQ Salt

A coating solution was made by dissolving 8.7 mg of DTFF:TCNQ in 1.74 ml of dioxane containing 174 mg of a polysulfone having the structure

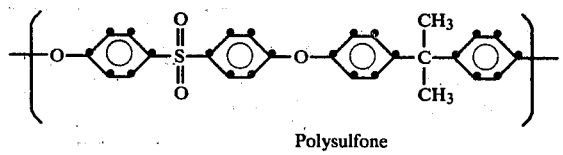

Polysulfone

The coatings were dried and vapor-treated as described in Example 2. Resistance values are disclosed in Table II.

TABLE II

| Solvent | Vapor Treatment Time (in seconds) | Resistance of Films (Ohm/Square) |
|---|---|---|
| Untreated Film | | $>10^9$ |
| Chloroform | 20 | $9 \times 10^4$ |
| Toluene | 30 | $11 \times 10^4$ |
| Trichloropropane | 30 | $1.6 \times 10^4$ |
| Trichloropropane | 90 | $2.0 \times 10^4$ |

EXAMPLE 3

Poly[ethylene-co-isopropylidenebis-(1,4-phenylene oxyethylene)-terephthalate] Films Containing DTFF:TCNQ Salt A mixture of 0.623 mmoles of DTFF was dissolved in hot THF, and 0.686 mmoles of TCNQ dissolved in hot acetonitrile was concentrated from 75 ml to 20 ml by heating. On cooling, a 1:1 salt of DTFF:TCNQ was obtained as a grey-black product. This salt was coated in Poly[ethylene-co-isopropylidenebis-(1,4-phenyleneoxy-ethylene)-terephthalate] as in Example 2 and then vapor-treated with chloroform for 120 seconds. The resistivity was $2.2 \times 10^4$ ohm/square. Microscopic examination of this film showed a multiplicity of connected dendrites or filament-like crystals of DTFF:TCNQ throughout the polyester.

EXAMPLE 4

Electrical Properties of the DTFF:ClO₄ Salts in Polymeric Films

A coating was made from a solution of 8.7 mg of DTFF:ClO₄ prepared as in Example 5, dissolved in hot dichloromethane with 174 mg of different polymers in 1.7 ml of dichloromethane. The ratio of salt to polymer was 1:20 by weight. The solution was coated with a wet thickness of 3 mils, dried, and vaportreated with several solvents. The resistance of DTTF:ClO₄ salts in poly-[ethylene-co-ethylene)-terephthalate] films are described in Table III.

TABLE III

| Solvent | Vapor Treatment Time (in seconds) | Resistance (Ohm/Square) |
|---|---|---|
| Acetonitrile | 35 | $1.8 \times 10^6$ |
| Dioxane | 120 | $1.2 \times 10^7$ |
| Chloroform | 60 | $1.15 \times 10^8$ |

The resistance of DTTF:ClO₄ salt in poly(4,4-isopropylidenediphenylene carbonate) films are disclosed in Table IV.

TABLE IV

| Solvent | Vapor Treatment Time (in seconds) | Resistance (Ohm/Square) |
|---|---|---|
| Acetonitrile | 60 | $2.6 \times 10^6$ |

TABLE IV-continued

| Solvent | Vapor Treatment Time (in seconds) | Resistance (Ohm/Square) |
| --- | --- | --- |
| Acetonitrile | 180 | $1.2 \times 10^6$ |
| Trichloropropane | 90 | $4 \times 10^6$ |
| Trichloropropane | 360 | $8.4 \times 10^4$ |

The resistance of DTTF:ClO$_4$ salts in poly(vinyl butyral) films are disclosed in Table V.

TABLE V

| Solvent | Vapor Treatment Time (in seconds) | Resistance (Ohm/Square) |
| --- | --- | --- |
| Acetonitrile | 60 | $2.6 \times 10^6$ |
| Trichloropropane | 60 | $1.1 \times 10^7$ |
| Chloroform | 60 | $6.6 \times 10^6$ |
| Dioxane | 60 | $7 \times 10^6$ |
| Trichloropropane | 120 | $4.2 \times 10^6$ |
| Poly(n-butylmethacrylate and p-styrene-sulfonic acid potassium salt) | | |

The invention has been described in detail with particular reference to preferred embodiments thereof, but it will be understood that variations and modifications can be effected within the spirit and scope of the invention.

What is claimed is:

1. An electrically conducting composition comprising an electrically insulating polymer and a charge transfer complex characterized in that the charge transfer complex (a) is in the form of dendrite crystals throughout the polymer and (b) is a salt consisting of a cation of 2-(4,5-dihydronaphtho[1,2-d]-1,3-dithiol-2-ylidene)-4,5-dihydronaphtho[1,2-d]-1,3-dithiole and an anion selected from the group consisting of 7,7,8,8− tetracyanoquinodimethane, ClO$_4^-$, BF$_4^-$, PF$_6^-$, F$^-$, Cl$^-$, I$^-$, and I$_3^-$.

2. A composition as in claim 1 wherein the anion is 7,7,8,8− tetracyanoquinodimethane.

3. A composition as in claim 2 wherein the anion is ClO$_4^-$.

4. A composition as in claims 1, 2 or 3 wherein the polymer is selected from the group consisting of polycarbonates, polyesters, polysulfones, poly(vinylbutyrals) and poly(n-butyl methacrylate-co-p-styrene sulfonic acid potassium salt).

5. A composition as in claims 1, 2 or 3 wherein the polymer is selected from the group consisting of poly(4,4'-isopropylidenediphenylene carbonate), poly-(oxy-1,4-phenylenesulfonyl-1,4-phenyleneoxy-1,4-phenyleneisopropylidene-1,-4-phenylene), poly[ethylene-co-isopropylidenebis-(1,4-phenyleneoxyethylene)-terephthalate], poly(vinylbutyral), and poly(n-butylmethacrylate-co-p-styrenesulfonic acid potassium salt).

6. A composition as in claims 1, 2 or 3 wherein the charge transfer complex is present in the polymer in an amount of about 0.1 to 20 weight percent, based on the total weight of the composition.

7. A method of making an electrically conductive composition comprising the steps of:
   (a) forming a charge transfer complex from a cation of 2-(4,5-dihydronaphtho[1,2-d]-1,3-dithiol-2-ylidene)-4,5-dihydronaphtho[1,2-d]-1,3-dithiole and an anion selected from the group consisting of 7,7,8,8− tetracyanoquinodimethane, ClO$_4^-$, BF$_4$, PF$_6$, F$^-$, Cl$^-$, I$^-$ and I$_3^-$;
   (b) mixing from about 1 to 20 parts of the charge transfer complex with about 5 to about 100 parts of an electrically insulating polymer; and
   (c) aggregating the charge transfer complex in the polymer thereby forming dendrite crystals throughout such polymer.

8. A method as in claim 7 wherein (a) the charge transfer complex is a salt consisting of a cation of 2-(4,5-dihydronaphtho[1,2-d]-1,3-dithiol-2-ylidene)-4,5-dihydronaphtho[1,2-d]-1,3-dithiole and anion selected from the group consisting of 7,7,8,8− tetracyanoquinodimethane, and ClO$_4$, (b) the polymer is selected from the group consisting of poly(4,4'-iso-propylidenediphenylene carbonate), poly(oxy-1,4-phenylenesulfonyl-1,4-phenyleneoxy-1,4-phenyleneisopropylidene-1,4-phenylene), poly[ethylene-co-isopropylidenebis-(1,4-phenyleneoxy-ethylene)terephthalate], poly(vinylbutyral), poly(n-butylmethacrylate-co-p-styrenesulfonic acid potassium salt) and (c) aggregation is obtained by vapor-treating the mixture of polymer and charge transfer complex with a material selected from the group consisting of chloroform, toluene, trichloropropane, dioxane and acetonitrile.

* * * * *

UNITED STATES PATENT AND TRADEMARK OFFICE
CERTIFICATE OF CORRECTION

PATENT NO. : 4,439,505
DATED : March 27, 1984
INVENTOR(S) : Jerome H. Perlstein and Neil F. Haley It is certified that error appears in the above-identified patent and that said Letters Patent are hereby corrected as shown below:

Col. 7, line 42, the part reading "claim 2" should read --claim 1--.

Col. 8, line 7, the part reading "1,-4-phenylene)" should read --1,4-phenylene)--.

Signed and Sealed this

Twenty-second Day of January 1985

[SEAL]

Attest:

DONALD J. QUIGG

Attesting Officer   Acting Commissioner of Patents and Trademarks

UNITED STATES PATENT AND TRADEMARK OFFICE
CERTIFICATE OF CORRECTION

PATENT NO. : 4,439,505

DATED : March 27, 1984

INVENTOR(S) : Jerome H. Perlstein & Neil F. Haley

It is certified that error appears in the above-identified patent and that said Letters Patent are hereby corrected as shown below Col. 7, lines 37 & 38 reading "7,7,8,8⁻ tetracyanoquinodimethane" should read --7,7,8,8-tetracyanoquinodimethane--.

Col. 7, line 40 reading "7,7,8,8⁻ tetracyanoquinodimethane" should read --7,7,8,8-tetracyanoquinodimethane--.

Col. 8, line 21 reading "7,7,8,8⁻ tetracyanoquinodimethane" should read --7,7,8,8-tetracyanoquinodimethane--.

Col. 8, lines 33 & 34 reading "7,7,8,8⁻ tetracyanoquinodimethane" should read --7,7,7,8-tetracyanoquinodimethane--.

Signed and Sealed this

Thirtieth Day of April 1985

[SEAL]

Attest:

DONALD J. QUIGG

Attesting Officer    Acting Commissioner of Patents and Trademarks